April 23, 1935.  M. P. McLAUGHLIN  1,998,632
FLEXIBLE METALLIC CONDUIT
Filed Aug. 1, 1934
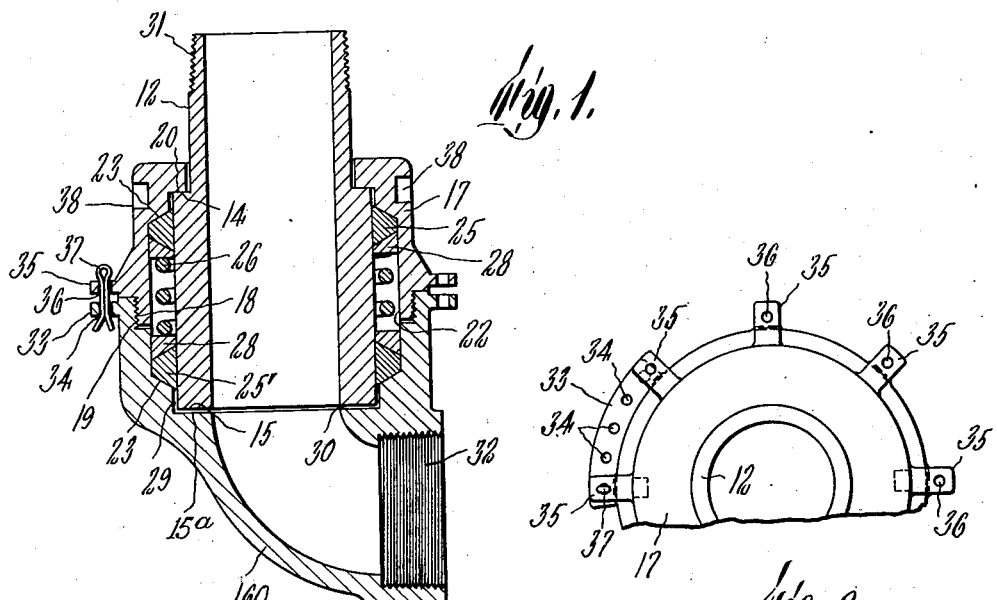
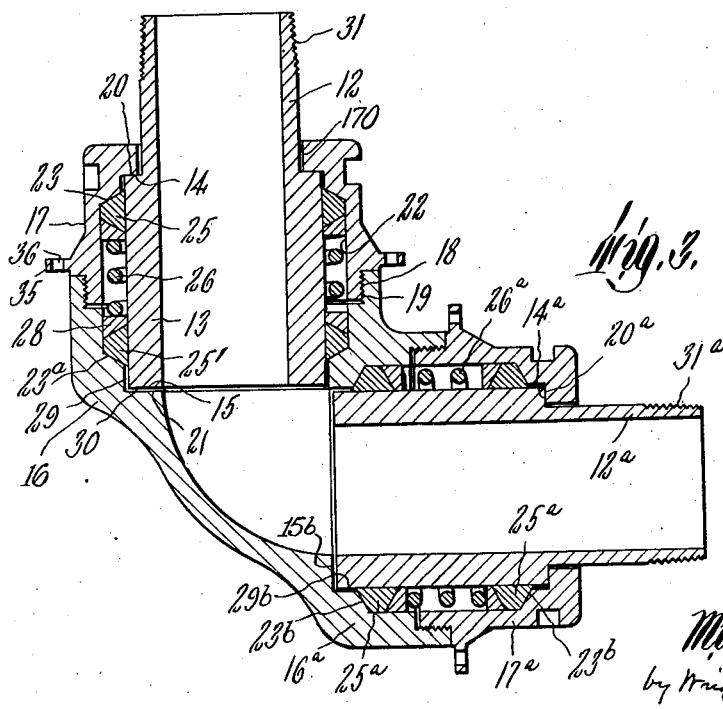
Inventor
Milton P. McLaughlin
by Wright, Brown, Quinby & May
Attys.

Patented Apr. 23, 1935

1,998,632

UNITED STATES PATENT OFFICE 1,998,632

FLEXIBLE METALLIC CONDUIT

Milton P. McLaughlin, Wakefield, Mass.

Application August 1, 1934, Serial No. 737,908

2 Claims. (Cl. 285—122)

This invention relates to a flexible conduit adapted to withstand the high internal pressure of steam or other fluid conducted by the conduit, and particularly to a conduit for conveying high pressure fluid between a locomotive and its tender, and between railway cars.

The object of the invention is to provide a conduit of simple and effective construction permitting desirable flexibility, and capable of long continued use without necessity of frequent repair.

Of the accompanying drawing forming a part of this specification,—

Figure 1 is a sectional view showing a compact embodiment of the invention.

Figure 2 is an end view of the conduit shown by Figure 1.

Figure 3 is a sectional view of an elongated conduit embodying the invention.

The same reference characters indicate the same parts in all of the figures.

My improved conduit as shown by Figure 1 comprises a vertically arranged conduit member 12 having an outer end portion adapted to be engaged with a fixed member of a train pipe line. I therefore call this conduit member the fixed member.

A sectional housing member enclosing the inner portion of the fixed member 12 is composed of an outer section 17 and an inner section 16, said sections being separably connected by screw threads 18 and 19. The fixed member 12 has between its ends an outwardly facing inner annular joint face 14. The outer section 17 has an inwardly facing outer annular joint face 20 pressed downwardly by the weight of the housing member against the fixed inner joint face 14 and forming therewith a running joint which permits rotation of the housing member.

The inner section 16 of the housing member has an elbow-shaped conducting bore 16I constituting an extension of the bore of the fixed member 12. The housing member has an annular upwardly facing internal face 15a surrounding the receiving end of the bore 160 and separated from the inner end face 15 of the fixed member 12 by an annular steam space 30, which permits a limited vertical play of the housing member on the fixed member 12, and a relatively light slightly separable bearing of the outer joint face 20 on the fixed inner joint face 14. Frictional resistance to the rotation of the outer joint face 20 and the housing member depending therefrom, is therefore minimized, there being no binding engagement of one joint face against the other sufficient to interfere objectionably with the flexibility of the conduit.

Portions of the fixed member 12 and the housing member constitute the concentric walls of an annular packing chamber which surrounds the lower portion of the fixed member, and is provided with outer and inner end walls 23 and 23a. The inner end of the packing chamber is in communication with the annular steam space 30, said space communicating with a crevice between the fixed member 12 and a circular bearing wall 29 formed in the housing section 16. In the packing means are included inner and outer compressible packing rings 25, 25', and a compression spring 26 interposed between said rings, metallic spring washers 28 being preferably interposed between the end convolutions of the spring and the packing rings.

The inner packing ring 25 bears on the inner end wall 23a and on inner zones of the side walls of the packing chamber, while the outer ring 25 bears on the outer end wall 23 and on outer zones of the side walls. The inner ring 25' is exposed to steam pressure coming from the steam space 30, and is movable by such pressure, and adapted to act as a piston to move the lower ring outwardly, increase the compression or tension of the spring and thereby augment its pressure on the outer ring 25, so that pressure is exerted on the outer ring to compact or solidify it against the outer end wall 23 and against outer zones of the side walls of the chamber and thereby prevent the possibility of leakage of steam to the running joint.

The compact conduit shown by Figure 1 is provided at the outer end of the bore 160 with a screw threaded socket 32 to engage a laterally extending conduit member or section constituting an extension of the conduit.

The conduit shown by Figure 3 is elbow-shaped, and includes the fixed conduit member 12, a housing member composed of the sections 16 and 17, the running joint faces 14 and 20, the packing chamber between the housing member and the fixed member 12, and the packing means including the packing rings 25, 25' and the spring 26, all arranged and operating as already described.

The inner section of the housing member is elbow-shaped and has a laterally projecting branch 16a, and a supplemental outer section 17a separably connected with said branch by screw threads. The branch 16a and section 17a collectively constitute a branch portion of the housing member. 12a designates a complemental conduit member supported at an angle to the fixed member 12 by the branch portion of the housing member. The supplemental conduit member 12ª and the housing section 17ª are provided with running joint faces 14ª and 20ª functioning like the faces 14 and 20. The housing member branch 16ª has an annular internal face 15ᵇ surrounding its bore and spaced from the inner end face 15ᶜ of the supplemental conduit by an annular steam space 30ª permitting a limited end play of the supplemental conduit member in the branch 16ª and supplemental conduit 12ª. This construction permits a slight horizontal end play of the conduit section 12ª, and results in a relatively light bearing of the joint face 14ª on the joint face 20ª, so that frictional resistance to the rotation of the supplemental conduit 12ᵇ in its bearings is minimized; such rotation being required to a limited extent when the conduit is in use.

A packing chamber is provided in the bearing member branch 16ª 17ª, said chamber containing packing means organized as shown by Figure 1 and the upper portion of Figure 3, the packing rings being designated by 25ª and the intermediate spring by 26ª.

I claim:

1. A flexible metallic conduit comprising a vertically arranged fixed conduit member having between its ends an outwardly facing inner annular joint face, a sectional housing member enclosing the inner portion of the fixed member and composed of outer and inner sections separably connected, the outer section having an inwardly facing outer annular joint face bearing on the fixed inner joint face and forming therewith a running joint to provide for rotation of the housing member, the lower inner section of the housing member having a conducting bore constituting an extension of the bore of the fixed member, the housing member having an annular internal shoulder surrounding the receiving end of its bore, said parts being so constructed and arranged that when the faces of the running joint are in contact the end of the fixed conduit member will be slightly spaced from said annular shoulder to provide a passageway for steam entering the space between the fixed conduit member and the housing, and minimize frictional resistance in the running joint between the inner joint face and the housing member.

2. A flexible metallic conduit as specified by claim 1, portions of the fixed member and the housing member constituting concentric walls of an annular packing chamber, and packing means in said chamber including inner and outer spaced apart compressible packing rings and a compression spring interposed between said rings, the inner ring being exposed to and movable upwardly by steam entering said space, and adapted to act as a piston to compress the spring, augment its pressure on the upper ring and exert pressure through the spring on the outer ring to compact the latter closely against the outer end wall and outer zones of the side walls, and thereby prevent leakage of steam to the running joint.

MILTON P. McLAUGHLIN.